(12) United States Patent
Ahn et al.

(10) Patent No.: US 9,723,184 B2
(45) Date of Patent: Aug. 1, 2017

(54) CAMERA MODULE AND A CAMERA FOR A VEHICLE

(71) Applicant: LG Innotek Co., Ltd., Seoul (KR)

(72) Inventors: Jae Wook Ahn, Seoul (KR); Je Kyung Park, Seoul (KR); Sun Min Hwang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 14/993,718

(22) Filed: Jan. 12, 2016

(65) Prior Publication Data

US 2016/0205294 A1 Jul. 14, 2016

(30) Foreign Application Priority Data

Jan. 12, 2015 (KR) .................. 10-2015-0004241

(51) Int. Cl.
*H04N 5/225* (2006.01)
*B60R 11/04* (2006.01)
(Continued)

(52) U.S. Cl.
CPC .......... *H04N 5/2252* (2013.01); *B60R 11/04* (2013.01); *G03B 17/08* (2013.01); *H04N 5/2253* (2013.01);
(Continued)

(58) Field of Classification Search
CPC .... G03B 17/08; H04N 5/2252–5/2254; H04N 5/2257; B60R 11/04
(Continued)

(56) References Cited

U.S. PATENT DOCUMENTS

| 8,542,451 B2* | 9/2013 | Lu .................. G02B 7/025 359/819 |
| 8,861,951 B2* | 10/2014 | Warren .................. G03B 17/02 348/373 |

(Continued)

FOREIGN PATENT DOCUMENTS

WO WO-2004047421 A2 6/2004
WO WO-2012005456 A2 1/2012
(Continued)

OTHER PUBLICATIONS

European Search Report dated Jul. 6, 2016 in European Application No. 16150712.4.

*Primary Examiner* — Ngoc-Yen Vu
(74) *Attorney, Agent, or Firm* — Saliwanchik, Lloyd & Eisenschenk (57) ABSTRACT

The exemplary embodiment of the present disclosure relates to a camera module including a rear-opened front body, a rear body coupled to a rear side of the front body to form an inner space, a lens part coupled to the front body, an image sensor accommodated at the inner space to convert a light having passed the lens part to an electrical signal, a PCB (Printed Circuit Board) accommodated at the inner space and mounted with the image sensor, and a closed curve-shaped packing member interposed between the front body and the rear body, wherein the packing member includes a support part extensively formed from the packing member to an inner side, and the front body or the rear body includes a support part accommodation groove having a shape corresponding to that of the support part, whereby adhesion-ability during assembly of packing member can be maximized to thereby minimize an installation defect, a depressed or stamped phenomenon of a packing member that may occur during assembly process.

17 Claims, 11 Drawing Sheets

(51) Int. Cl.
    *G03B 17/08*     (2006.01)
    *H01L 31/0203*     (2014.01)
    *G01D 11/24*     (2006.01)

(52) U.S. Cl.
    CPC ......... H04N 5/2254 (2013.01); H04N 5/2257 (2013.01); *G01D 11/245* (2013.01)

(58) Field of Classification Search
    USPC .................................. 348/374; 257/433–434
    See application file for complete search history.

(56) References Cited

U.S. PATENT DOCUMENTS

| | | | | |
|---|---|---|---|---|
| 8,866,919 | B2* | 10/2014 | Ahn | G03B 5/00 348/208.7 |
| 9,413,933 | B2* | 8/2016 | Yu | H04N 5/2252 |
| 9,525,832 | B1* | 12/2016 | De La Cruz | H04N 5/369 |
| 2008/0278621 | A1 | 11/2008 | Cho et al. | |
| 2009/0244361 | A1* | 10/2009 | Gebauer | H04N 5/2253 348/373 |
| 2014/0354878 | A1* | 12/2014 | Winter | H04N 5/2252 348/374 |
| 2016/0212308 | A1* | 7/2016 | Ahn | G03B 17/02 |

FOREIGN PATENT DOCUMENTS

| | | |
|---|---|---|
| WO | WO-2012067377 A2 | 5/2012 |
| WO | WO-2013103548 A1 | 7/2013 |

* cited by examiner

CAMERA MODULE AND A CAMERA FOR A VEHICLE

CROSS-REFERENCE TO RELATED APPLICATION

The present application claims the benefit under 35 U.S.C. §119 of Korean Patent Application No. 10-2015-0004241, filed Jan. 12, 2015, which is hereby incorporated by reference in its entirety.

BACKGROUND OF THE DISCLOSURE

Field of the Disclosure

The teachings in accordance with exemplary and non-limiting embodiments of this disclosure generally relate generally to a camera module and a camera for a vehicle.

Discussion of the Related Art

This section provides background information related to the present disclosure which is not necessarily prior art.

A camera module has been recently used to obtain an image even on a vehicle due to sophistication and automation of vehicle parts. Exemplary representative camera modules include front and rear side monitoring cameras and camera modules used for black box.

Meantime, the camera modules for vehicular camera thus mentioned suffer from disadvantages of at least a part thereof being mounted to a vehicle while being exposed to outside of the vehicle, and therefore require a strict standard of inner waterproofing performance.

SUMMARY OF THE DISCLOSURE

Exemplary aspects of the present disclosure are to substantially solve at least the above problems and/or disadvantages and to provide at least the advantages of a camera module, and therefore, an exemplary aspect of the present disclosure is to provide a camera module including a packing member improved in adhesionability during assembly of the packing member. Another exemplary aspect of the present disclosure is to include a camera for a vehicle including the camera module.

It is an object of present disclosure is to provide a camera module reinforced in waterproofing performance through stable mounting of packing member.

Accordingly, in one general aspect of the present disclosure, there is provided a camera module, comprising: a rear-opened front body; a rear body coupled to a rear side of the front body to form an inner space; a lens part coupled to the front body; an image sensor accommodated at the inner space to convert a light having passed the lens part to an electrical signal; a PCB (Printed Circuit Board) accommodated at the inner space and mounted with the image sensor; and a closed curve-shaped packing member interposed between the front body and the rear body, wherein the packing member includes a support part extensively formed from the packing member to an inner side, and the front body or the rear body includes a support part accommodation groove having a shape corresponding to that of the support part.

Preferably, but not necessarily, the packing member may include a first lateral surface and a second lateral surface, and the support part may include a first support part extended from the first lateral surface and a second support part extended from the second lateral surface.

Preferably, but not necessarily, each of the first and second support parts may have a different shape.

Preferably, but not necessarily, the first support part may be protruded inwardly from the first lateral surface, and the first support part may be formed with a through hole through which the first support part horizontally passes.

Preferably, but not necessarily, the rear body may include a first support part accommodation groove configured to accommodate the first support part, and a protruder inserted into the through hole by being protrusively formed from the first support part accommodation groove.

Preferably, but not necessarily, the second support part may include a hitching part arranged at an inner side of the second lateral surface and a connection part configured to connect the hitching part and the second lateral surface, wherein width of the connection part may be smaller than that of the hitching part.

Preferably, but not necessarily, the rear body may include the hitching part, and a second support part accommodation groove formed in a shape corresponding to that of the hitching part and the connection part to accommodate the hitching part and the connection part.

Preferably, but not necessarily, the rear body may include a partition wall protrusively formed from the rear body to a front side, the packing member may be so arranged as to wrap the partition wall in order to allow an inner surface to be contacted by the partition wall, and the partition wall may include a distancing part having a width corresponding to that of the connection part to accommodate the connection part.

Preferably, but not necessarily, at least a part of the hitching part may be so arranged as to contact the inner surface of the partition wall.

Preferably, but not necessarily, the packing member may be formed with a silicone or a rubber.

Preferably, but not necessarily, the first lateral surface and the second lateral surface may be so arranged as to be adjacently positioned.

Preferably, but not necessarily, the first lateral surface and the second lateral surface may be so arranged as to face each other.

Preferably, but not necessarily, the second lateral surface may be positioned adjacent to the first lateral surface, the packing member may include a third lateral surface adjacent to the second lateral surface and a fourth lateral surface adjacent to the first lateral surface, and the support part may further include a third support part extended from the third lateral surface and a fourth support part extended from the fourth lateral surface.

Preferably, but not necessarily, one of the first to fourth support parts may have a shape different from that of the other three support parts.

Preferably, but not necessarily, the lens part may include at least one lens, and a barrel configured to support the lens, and a sealing member may be interposed between the barrel and the front body.

Preferably, but not necessarily, the front body and the rear body may be coupled by a screw.

Preferably, but not necessarily, the packing member may further include an avoidance part so formed as to prevent interference with the screw.

In another general aspect of the present disclosure, there is provided a camera for a vehicle, comprising: a rear-opened front body; a rear body coupled to a rear side of the front body to form an inner space; a lens part coupled to the front body; an image sensor accommodated at the inner space to convert a light having passed the lens part to an electrical signal; a PCB (Printed Circuit Board) accommodated at the inner space and mounted with the image sensor;

and a closed curve-shaped packing member interposed between the front body and the rear body, wherein the packing member includes a support part extensively formed from the packing member to an inner side, and the front body or the rear body includes a support part accommodation groove having a shape corresponding to that of the support part.

Advantageous Effects of the Disclosure

Teachings in accordance with the exemplary embodiments of the present disclosure have an advantageous effect in that adhesionability during assembly of packing member can be maximized to thereby minimize a depressed or stamped phenomenon of a packing member that may occur during assembly process.

Another advantageous effect is that a support part is formed at a ring-shaped packing member to perfectly perform a waterproofing performance through prevention of detachment of packing member during connection between a front body and a rear body, whereby defect rate of camera module can be decreased.

DETAILED DESCRIPTION

Exemplary embodiments of the present disclosure will be described in detail with reference to the accompanying drawings. It will be understood that same reference numerals are used throughout the different drawings to designate the same components. In describing the present disclosure, detailed descriptions of constructions or processes known in the art may be omitted to avoid obscuring appreciation of the invention by a person of ordinary skill in the art with unnecessary detail regarding such known constructions and functions.

It will be understood that, although the terms first, second, third, A, B, (a), (b), etc., may be used herein to describe various elements, components, regions, layers and/or sections, these elements, components, regions, layers and/or sections should not be limited by these terms. These terms are only used to distinguish one element, component, region, layer or section from another element, component, region, layer or section.

When an element or a layer is referred to as being "on," "engaged to," "connected to," or "coupled to" another element or layer, it may be directly on, engaged, connected or coupled to the other element or layer, or intervening elements or layers may be present.

The optical direction to be used hereinafter may be defined as an optical direction of a lens module coupled to a lens driving part. Meantime, the optical direction may be interchangeably used with a vertical direction and a z axis direction.

Now, exemplary embodiments of the present disclosure will be described in detail with reference to the accompanying drawings.

First Exemplary Embodiment

Hereinafter, configuration of a camera module according to a first exemplary embodiment of the present disclosure will be described with reference to FIGS. 1 to 4.

Figure 1:
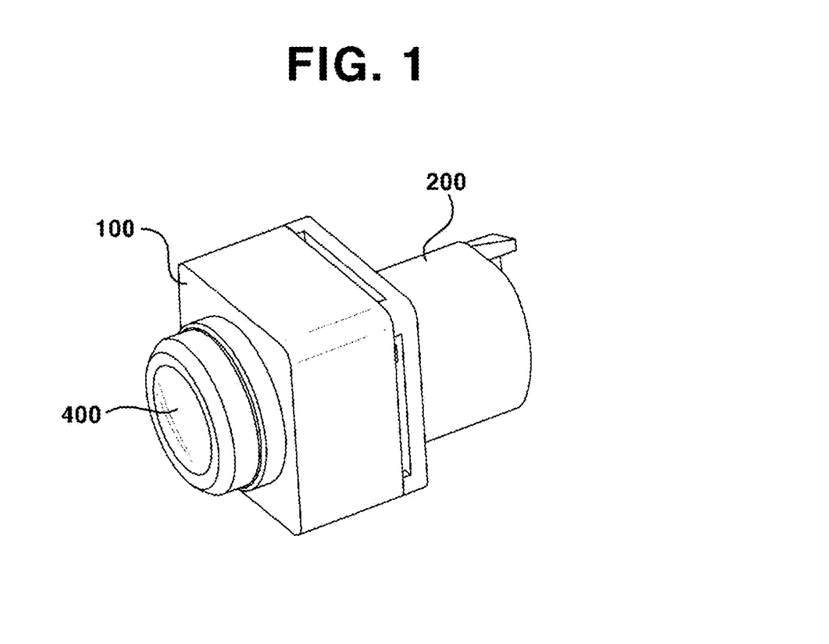
FIG. 1 is a perspective view illustrating a camera module according to a first exemplary embodiment of the present disclosure.
Figure 2:
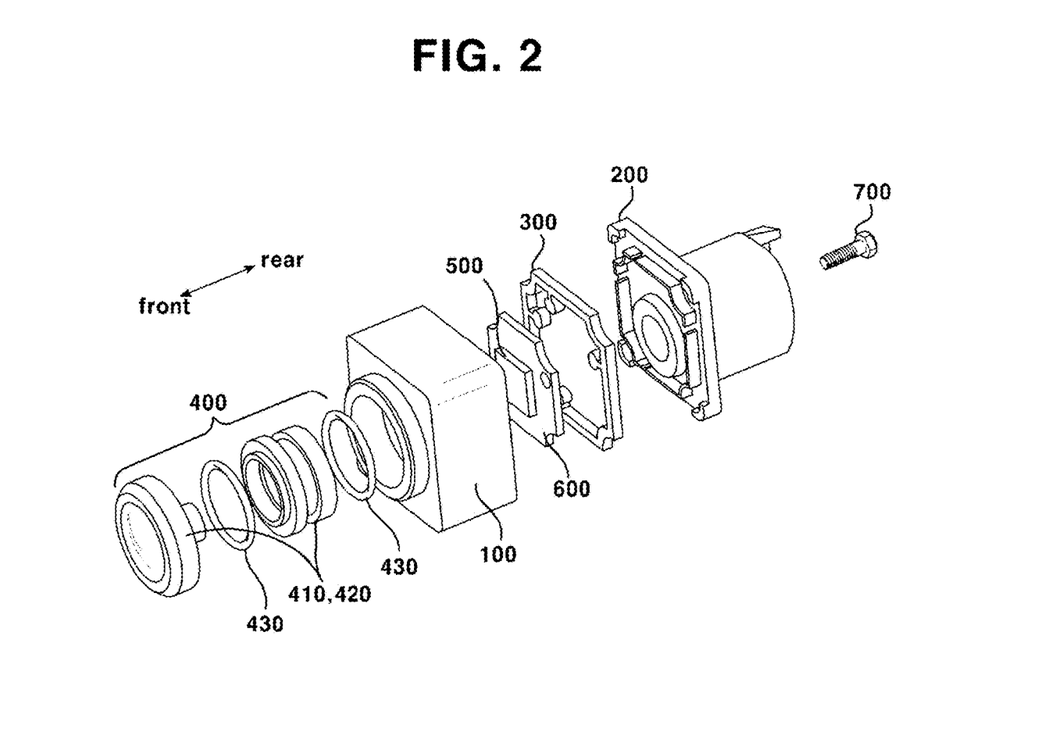
FIG. 2 is an exploded perspective view of a camera module according to a first exemplary embodiment of the present disclosure.
Figure 3:
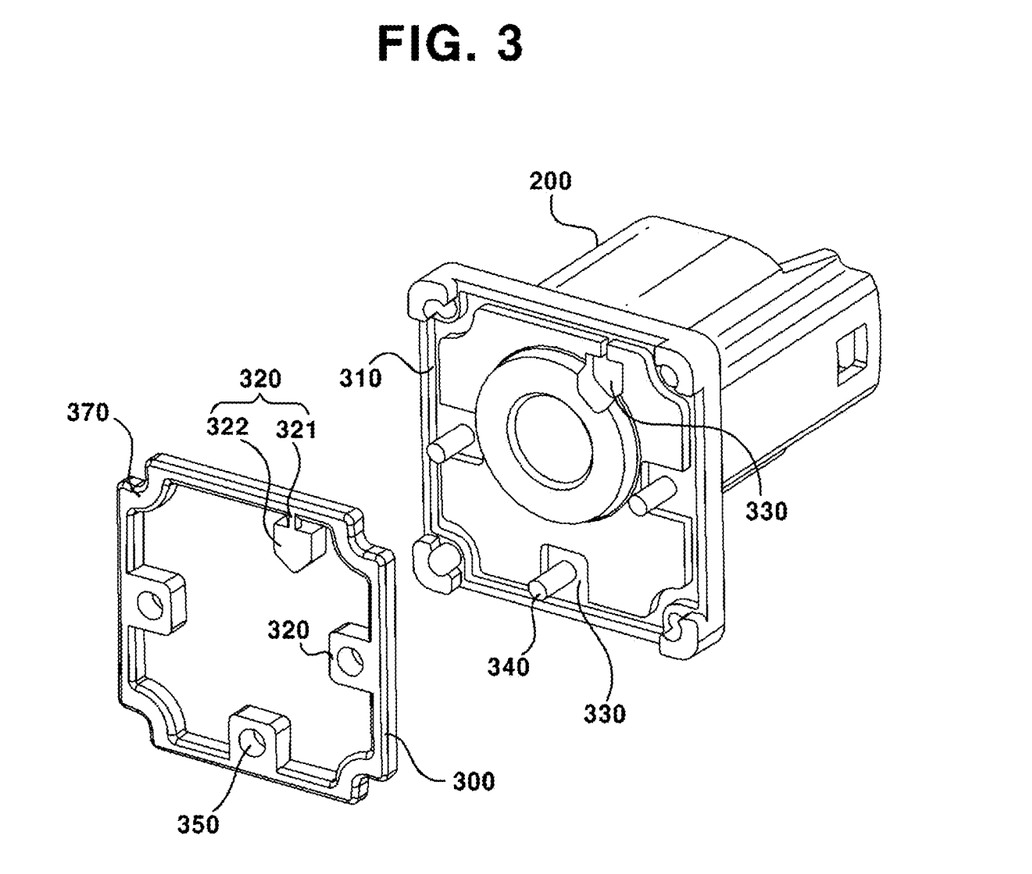
FIG. 3 is an exploded perspective view illustrating the way a rear body is formed with a packing accommodation groove according to a first exemplary embodiment of the present disclosure.
Figure 4:
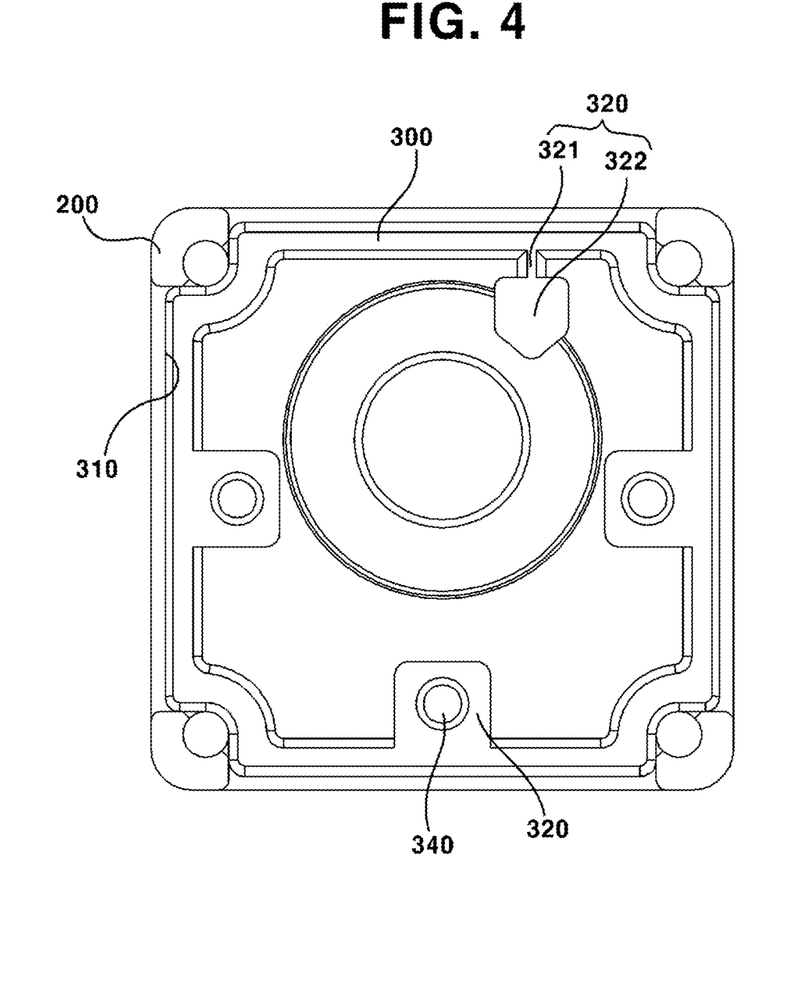
FIG. 4 is a plan view illustrating the way a packing member is inserted into a packing accommodation groove according to a first exemplary embodiment of the present disclosure.

FIG. 1 is a perspective view illustrating a camera module according to a first exemplary embodiment of the present disclosure, FIG. 2 is an exploded perspective view of a camera module according to a first exemplary embodiment of the present disclosure, FIG. 3 is an exploded perspective view illustrating the way a rear body is formed with a packing accommodation groove according to a first exemplary embodiment of the present disclosure, and FIG. 4 is a plan view illustrating the way a packing member is inserted into a packing accommodation groove according to a first exemplary embodiment of the present disclosure.

Referring to FIGS. 1 to 4, a camera module according to a first exemplary embodiment of the present disclosure may include a front body (100), a rear body (200), a packing member (300), a lens part (400), an image sensor (500) and a PCB (600, Printed Circuit Board). However, one or more elements may be omitted from the front body (100), the rear body (200), the packing member (300), the lens part (400), the image sensor (500) and the PCB (600), all of which forms the camera module.

Referring to FIGS. 1 and 2, the front body (100) may include a front surface and a lateral surface extended from the front surface to a rear side. Meantime, the front body (100) may be a rear-side opened type. A front surface of the front body (100) may be formed with an opening coupled by a lens part.

A front side of the rear body (200) may be coupled to a rear side of the front body (100) to thereby form an inner space. The front body (100) and the rear body (200) may be coupled by a screw (700). Furthermore, the front body (100) and the rear body (200) may be coupled by a hook or an adhesive agent.

The packing member (300) may be interposed between the front body (100) and the rear body (200) to prevent moisture from entering from outside into an inner space formed by the front body (100) and the rear body (200). The packing member (300) may be formed to correspond to the front body (100) and the rear body (200). The packing member (300) may be formed to correspond to a shape of a rear surface of the front body (100) or a shape of a front surface of the rear body (200). However, the present disclosure is not limited thereto, and the packing member (300) may take any shape as long as the packing member (300) can perform the packing operation by being arranged at a coupled area between the front body (100) and the rear body (200).

The lens part (400) may be stacked with at least one lens (410) to be assembled on a barrel (420). The barrel (420) assembled with the lens (410) may be mounted at an opening at a front side of the front body (100). A sealing member (430) may be interposed between the barrel (420) and the front body (100). The sealing member (430) may be an O-ring, for example. An inner space formed between the front body (100) and the rear body (200) is air-tightly sealed by the sealing member (430) and the packing member (300) to thereby prevent moisture or humidity from entering from outside.

The image sensor (500) may concentrate the light incident by passing through the lens unit (400) to an electrical signal. The image sensor (500) may be accommodated at an inner space formed by the front body (100) and the rear body (200).

The PCB (600, Printed Circuit Board) may be mounted at a front surface with the image sensor (500). The PCB (600) may be accommodated at an inner space formed by the front body (100) and the rear body (200). The PCB (600) may include a connector (not shown) configured to electrically connect external devices including a power supply unit.

Referring to FIGS. 3 and 4, the packing member (300) may include an inwardly protruded support part (320). The support part (320) of the packing member (300) may be formed with a through hole (350). Furthermore, the support part (320) may include a connection part (321) and a hitching part (322), for example. The hitching part (322) may be connected at a distal end to the connection part (321) and formed with a width broader than that of the connection part (321). The packing member (300) may include an avoidance part (370) so bent as not to interfere with the screw (700). The packing member (300) may be formed with a silicone or a ring-shaped rubber material, for example.

The front body (100) and the rear body (200) may be injection molded with a metal or a synthetic resin. A front surface of the rear body (200) may be formed with a concaved packing member accommodation groove (310) to accommodate the packing member (300). Alternatively, the packing member accommodation groove (310) may be so formed as to be symmetrical at the front body (100) and the rear body (200).

The concaved packing member accommodation groove (310) serves to prevent the packing member (300) from being detached. Furthermore, the concaved packing member accommodation groove (310) may include a support part accommodation groove (330) concavely formed to an inward side to accommodate the support part (320) of the packing member (300). In this case, it would be more effective to prevent the packing member (300) from being detached from the packing member accommodation groove (310).

A front surface of the rear body (200), i.e., the support part accommodation groove (330), may be formed with a protruder (340). The protruder (340) may be inserted into the through hole (350) of the support part (320) to support the packing member (300). The packing member accommodation groove (310) may be thinner than the packing member (300). In this case, the sealing ability may be strengthened due to compression to the packing member (300) when the front body (100) and the rear body (200) are coupled. For example, when the packing member accommodation groove (310) is formed on a rear surface of the front body (100) and a front surface of the rear body (200), the depth of the packing member accommodation groove (310) formed on each of the rear surface of the front body (100) and the front surface of the rear body (200) may be smaller than a radius of the packing member (300).

Second Exemplary Embodiment

Albeit not being illustrated in the drawings, the packing member accommodation groove (310) may be formed on a rear surface of the front body (100). That is, there is a difference from the first exemplary embodiment where the packing member accommodation groove (310) is formed at a front surface of the rear body (200). The explanation of the packing member accommodation groove (310) according to the second exemplary embodiment can be inferred from the packing member accommodation groove (310) according to the first exemplary embodiment.

Third Exemplary Embodiment

Hereinafter, configuration of a camera module according to a third exemplary embodiment of the present disclosure will be described with reference to FIGS. 5 and 6. In explaining the third exemplary embodiment of the present disclosure, same reference numerals as in the first exemplary embodiment will be used to designate the same components, and redundant descriptions will be omitted.

Figure 5:
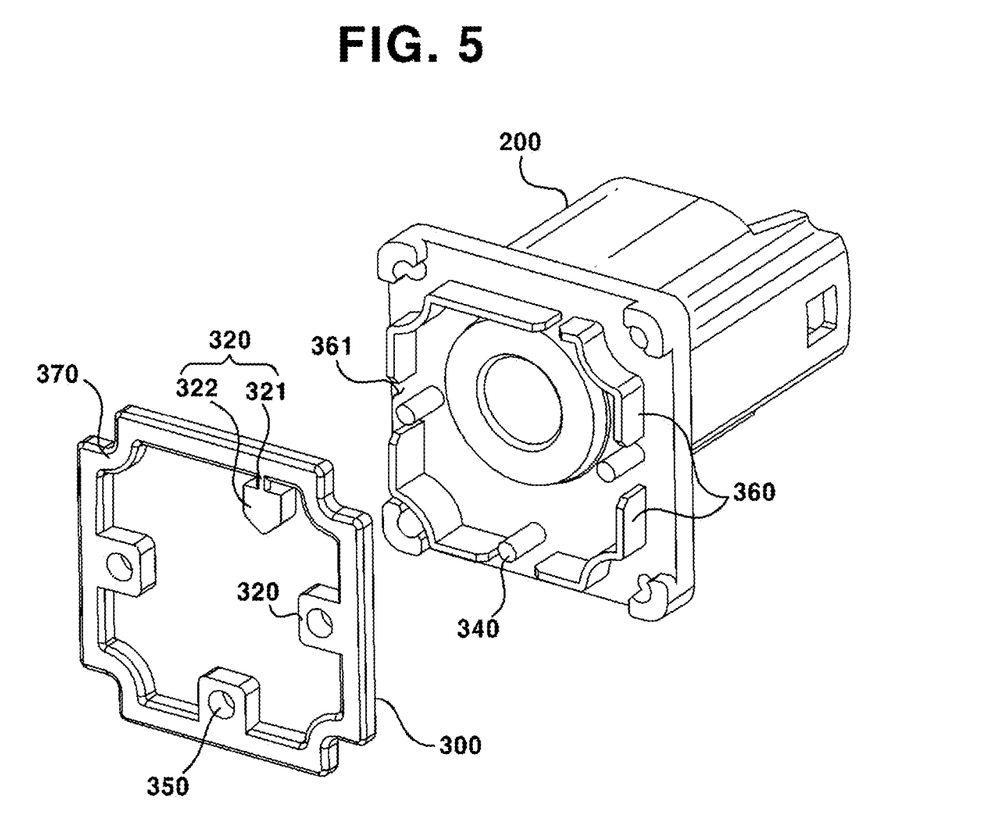
FIG. 5 is an exploded perspective view illustrating the way a partition wall is formed at a rear body according to a third exemplary embodiment of the present disclosure.
Figure 6:
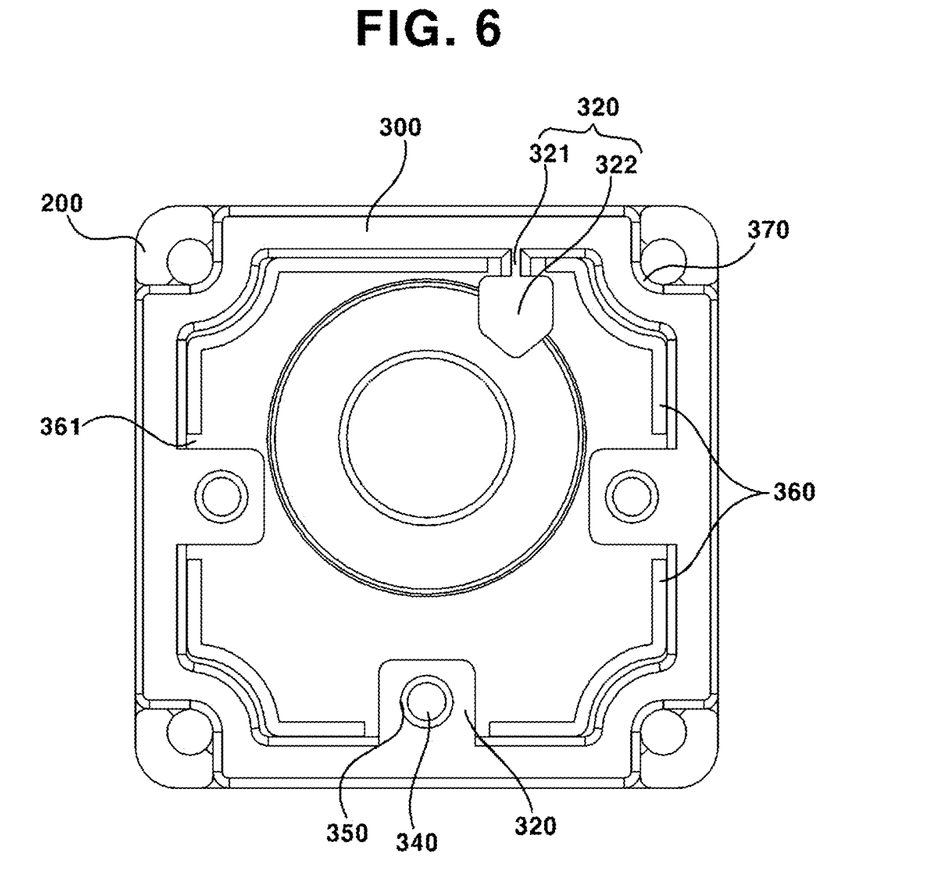
FIG. 6 is a plan view illustrating the way a packing member is supported by a partition wall according to a third exemplary embodiment of the present disclosure.

FIG. 5 is an exploded perspective view illustrating the way a partition wall is formed at a rear body according to a third exemplary embodiment of the present disclosure, and FIG. 6 is a plan view illustrating the way a packing member is supported by a partition wall according to a third exemplary embodiment of the present disclosure.

Referring to FIGS. 1, 2, 5 and 6, a camera module according to a third exemplary embodiment of the present disclosure may include a partition wall (360) formed at a front surface of the rear body (200) and more protruded than a thickness of the packing member (300) toward the front body (100) to prevent the packing member (300) from being detached. The partition wall (360) may be brought into contact with an inner side of the packing member (300). The partition wall (360) may prevent a mounting position of the packing member (300) from being twisted when the front body (100) and the rear body (200) are coupled.

Meantime, the partition wall (360) may be discontinuous by forming a distancing part (361) to allow the support part (320) of the packing member (300) to crisscross. The distancing part (361) of the partition wall (360) may be so formed as to correspond to a part of the shape of the support part (320). For example, the distancing part (361) may accommodate the support part (320) by being so formed as to correspond to a width of the support part (320). When the support part (320) is formed as a hitching part (322) of the connection part (321), the distancing part (361) may be so formed as to correspond to a width of the connection part (321). At this time, the hitching part (322) may be so formed as to be wider than the connection part (321). In this case, the connection part (321) is arranged at the distancing part (361) and the hitching part (322) is hitched at an inner lateral surface of the partition wall (360), whereby the packing member (300) can be securely arranged between the front body (100) and the rear body (200). The support part (320) of the packing member (300) may be formed with a through hole (350) and the protrude (340) formed at the front surface of the rear body (200) may be inserted into the through hole (350) to restrict the movement of the support part (320). In this case, the packing member (300) may be securely arranged between the front body (100) and the rear body (200).

Fourth Exemplary Embodiment

Albeit not being illustrated in the drawings, the partition wall (360) may be formed on a rear surface of the front body (100). That is, there is a difference from the third exemplary embodiment where the partition wall (360) is formed at a front surface of the rear body (200). The explanation of the partition wall (360) according to the fourth exemplary embodiment can be inferred from the partition wall (360) according to the third exemplary embodiment.

Hereinafter, structure and shape of a packing member according to an exemplary embodiment of the present disclosure and according to a variation of exemplary embodiments of the present disclosure will be described.

Figure 7:
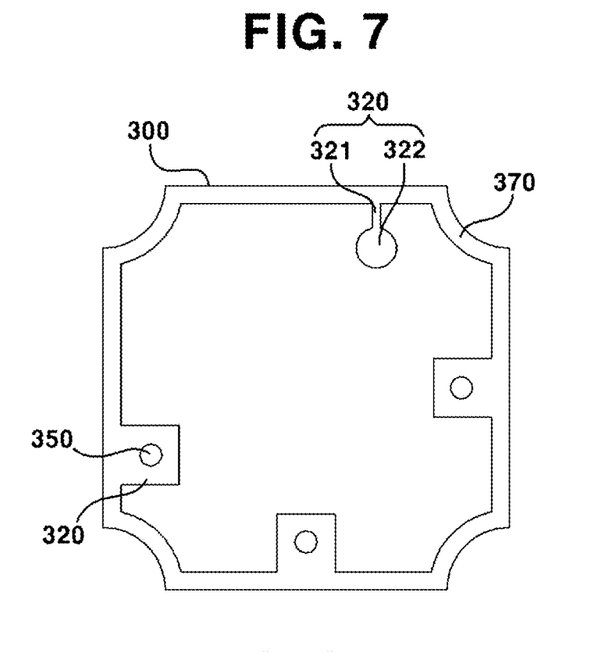
FIG. 7 is a plan view illustrating a packing member according to an exemplary embodiment of the present disclosure.

FIG. 7 is a plan view illustrating a packing member according to an exemplary embodiment of the present disclosure, and FIGS. 8 to 14 are plan views illustrating a packing member according to variations of exemplary embodiments of the present disclosure.

Referring to FIGS. 7 to 14, the packing member (300) may be variably formed. Furthermore, a packing accommodation groove (310) or a partition wall (360) may be formed to correspond to various shapes of the packing member (300).

Referring to FIG. 7, the packing member according to an exemplary embodiment of the present disclosure may include four (4) lateral sides. Each of the four (4) lateral sides at the packing member (300) may be protrusively formed toward an inner side of the support part (320).

To be more specific, three (3) lateral sides out of the four (4) lateral sides of the packing member (300) may be arranged with support part (320) formed with the through hole (350). Furthermore, the remaining one (1) lateral side of the four (4) lateral sides may be arranged with a support part (320) formed with a connection part (321) and a hitching part (322).

Figure 8:
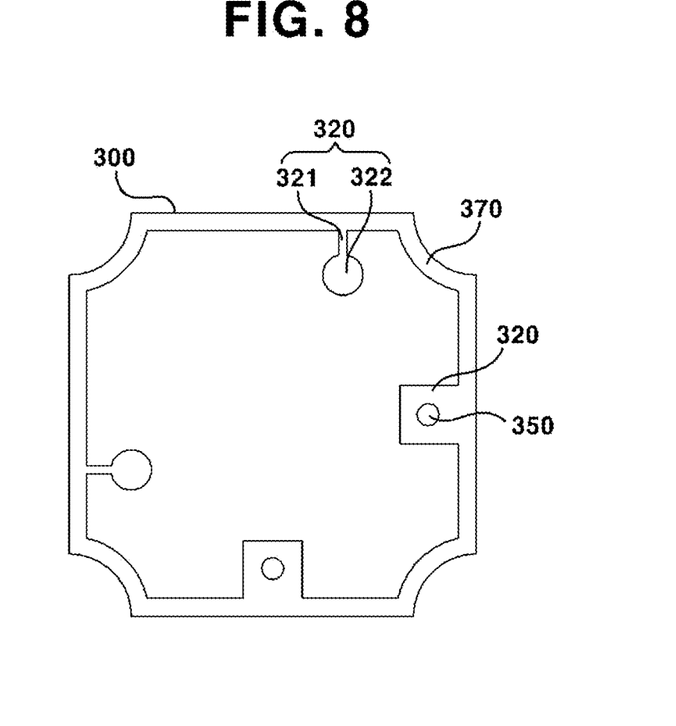
FIGS. 8 to 14 are plan views illustrating a packing member according to variations of exemplary embodiments of the present disclosure.

Now, referring to FIG. 8, the packing member (300) according to a variation of exemplary embodiments of the present disclosure may include four (4) lateral sides. Each of the four lateral sides of the packing member (300) may be protrusively formed with the support part (320) toward an inner side thereof. To be more specific, the support part (320) formed with the through hole (350) may be arranged at two adjacent lateral sides out of four (4) lateral sides. Furthermore, remaining two (2) lateral sides out of the four lateral sides may be arranged with the support part (320) formed with the connection part (321) and the hitching part (322).

Figure 9:
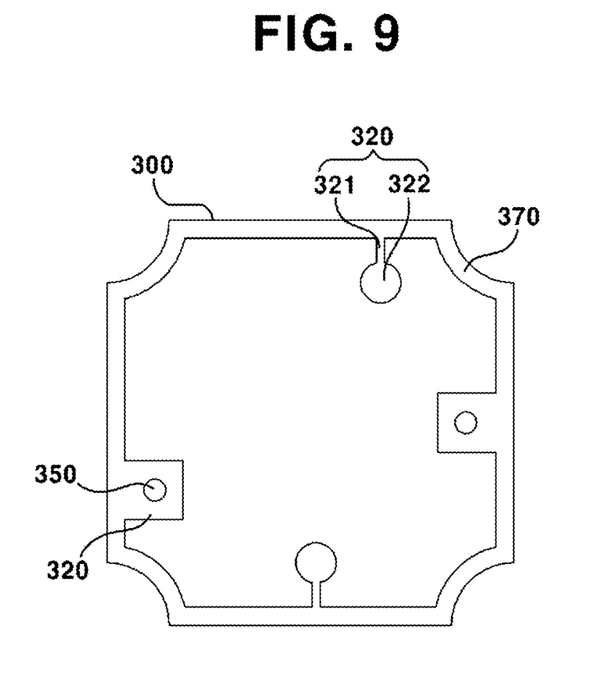

Referring to FIG. 9, the packing member (300) according to a variation of exemplary embodiments of the present disclosure may include four (4) lateral sides. Each of the four lateral sides of the packing member (300) may be protrusively formed with the support part (320) toward an inner side thereof. To be more specific, the packing member (300) may be arranged at two facing lateral sides out of four (4) lateral sides with the support part (320) formed with the through hole (350). To be more specific, the packing member (300) may be arranged at two facing lateral sides out of four lateral sides with the support part (320) formed with the through hole (350). Furthermore, remaining two (2) lateral sides out of the four lateral sides may be arranged with the support part (320) formed with the connection part (321) and the hitching part (322).

Figure 10:
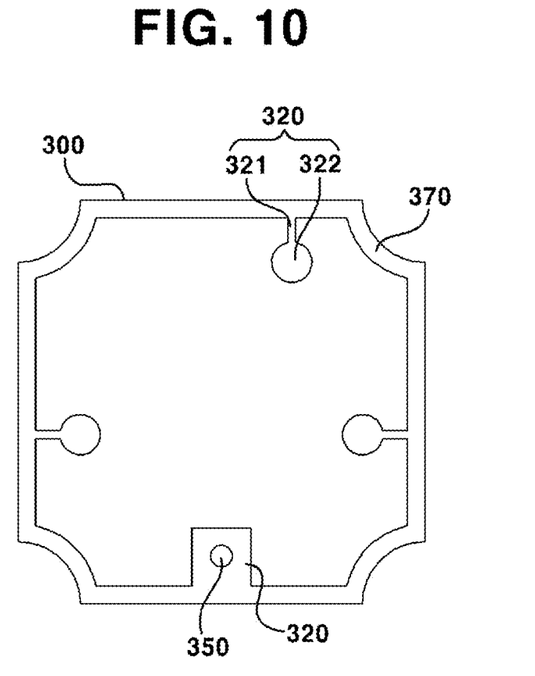

Referring to FIG. 10, the packing member (300) according to a variation of exemplary embodiments of the present disclosure may include four (4) lateral sides. Each of the four lateral sides of the packing member (300) may be protrusively formed with the support part (320) toward an inner side thereof. To be more specific, the packing member (300) may be arranged at one lateral side out of four (4) lateral sides with the support part (320) formed with the through hole (350). To be more specific, the packing member (300) may be arranged at remaining three (3) lateral sides out of the four lateral sides with the support part (320) formed with the connection part (321) and the hitching part (322).

Figure 11:
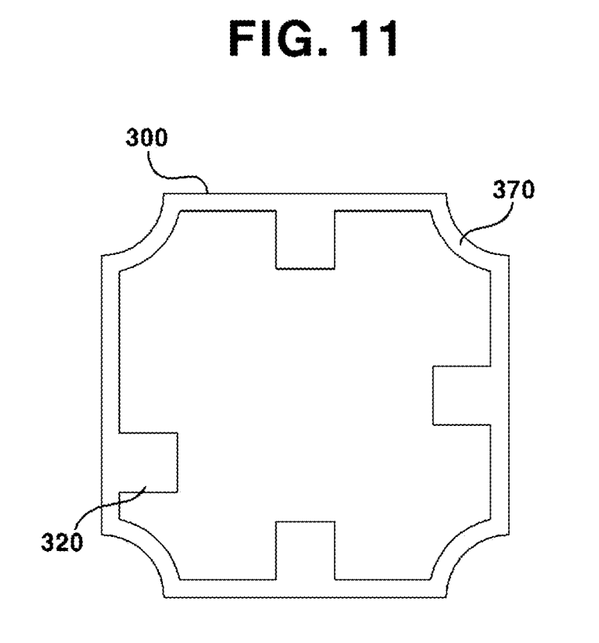

Referring to FIG. 11, the packing member (300) according to a variation of exemplary embodiments of the present disclosure may include four (4) lateral sides. Each of the four lateral sides of the packing member (300) may be protrusively formed with the support part (320) toward an inner side thereof. To be more specific, each of four (4) lateral sides of the packing member (300) may be protrusively arranged with a square-shaped support part (320).

Figure 12:
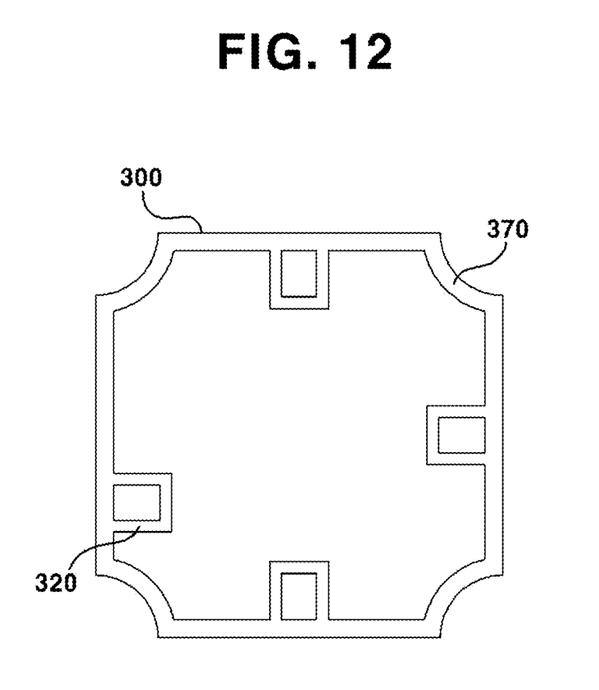

Referring to FIG. 12, the packing member (300) according to a variation of exemplary embodiments of the present disclosure may include four (4) lateral sides. Each of the four lateral sides of the packing member (300) may be protrusively formed with the support part (320) toward an inner side thereof. To be more specific, each of four (4) lateral sides of the packing member (300) may be protrusively arranged with a square-shaped support part (320) formed with a square-shaped through hole.

Figure 13:
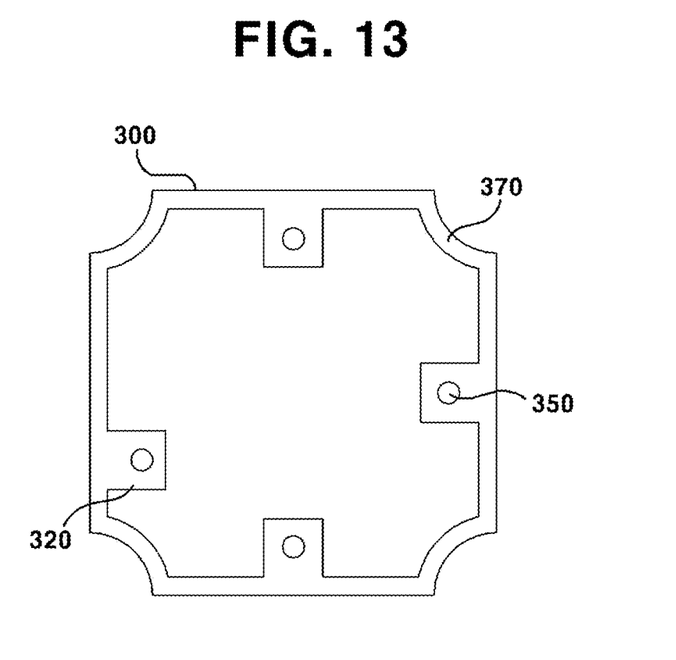

Referring to FIG. 13, the packing member (300) according to a variation of exemplary embodiments of the present disclosure may include four (4) lateral sides. Each of the four lateral sides of the packing member (300) may be protrusively formed with the support part (320) toward an inner side thereof. To be more specific, each of four (4) lateral sides of the packing member (300) may be protrusively arranged with a square-shaped support part (320) formed with a round-shaped through hole (350).

Figure 14:
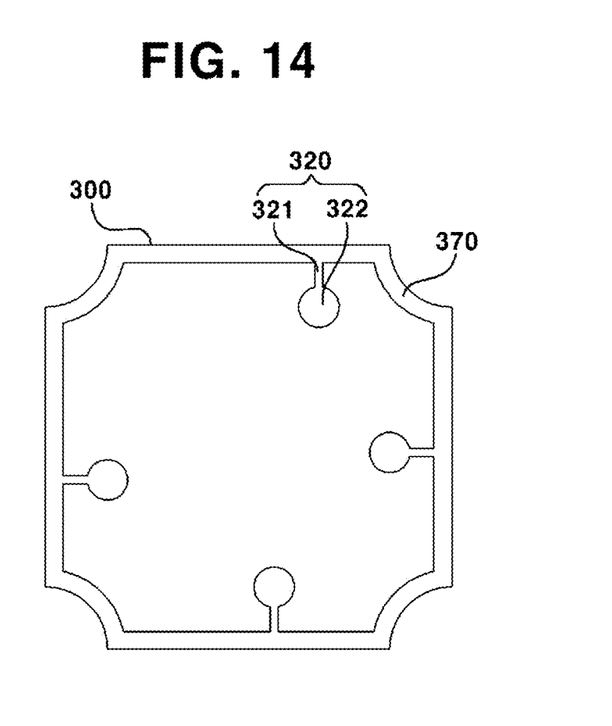

Referring to FIG. 14, the packing member (300) according to a variation of exemplary embodiments of the present disclosure may include four (4) lateral sides. Each of the four lateral sides of the packing member (300) may be protrusively formed with the support part (320) toward an inner side thereof. To be more specific, each of four (4) lateral sides of the packing member (300) may be protrusively arranged with a support part (320) formed with a connection part (320) and a hitching part (322).

The abovementioned packing members (300) may be implemented by combining the abovementioned exemplary embodiments and variations.

Meantime, apart from the abovementioned first to fourth exemplary embodiments, the partition wall (360) at the rear surface of the front body (100) or the front surface of the rear body (200) may be protrusively formed by being connected to an inner side of the packing accommodation groove (310) to allow integrally forming the partition wall (360) and the packing accommodation groove (310). Furthermore, any one of the rear surface of the front body (100) and the front surface of the rear body (200) may be formed with the partition wall (360), and the other one of the rear surface of the front body (100) and the front surface of the rear body (200) may be formed with the packing accommodation groove (310). Furthermore, other various exemplary embodiments may be also implemented.

It should be appreciated that, while all the elements comprising the foregoing exemplary embodiments have been presented to be coupled to one or operated by being coupled, the present disclosure is not limited thereto. All the elements may operate by being selectively coupled to one or more than one.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above-mentioned camera module according to the exemplary embodiments of the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A camera module, comprising:
   a rear-opened front body;
   a rear body coupled to a rear side of the front body to form an inner space;
   a lens part coupled to the front body;
   an image sensor accommodated at the inner space to convert a light having passed the lens part to an electrical signal;
   a PCB (Printed Circuit Board) accommodated at the inner space and mounted with the image sensor; and
   a closed curve-shaped packing member interposed between the front body and the rear body,
   wherein the packing member includes a support part extensively formed from the packing member to an inner side, and the front body or the rear body includes a support part accommodation groove having a shape corresponding to that of the support part;
   wherein the packing member includes a first lateral surface and a second lateral surface, and the support part includes a first support part extended from the first lateral surface and a second support part extended from the second lateral surface; and
   wherein the first support part has a different shape than the second support part.

2. The camera module of claim 1, wherein the first support part is protruded inwardly from the first lateral surface and the first support part is formed with a through hole through which the first support part horizontally passes.

3. The camera module of claim 2, wherein the rear body includes a first support part accommodation groove configured to accommodate the first support part, and a protruder inserted into the through hole by being protrusively formed from the first support part accommodation groove.

4. The camera module of claim 1, wherein the second support part includes a hitching part arranged at an inner side of the second lateral surface and a connection part configured to connect the hitching part and the second lateral surface, wherein width of the connection part is smaller than that of the hitching part.

5. The camera module of claim 4, wherein the rear body includes the hitching part, and a second support part accommodation groove formed in a shape corresponding to that of the hitching part and the connection part to accommodate the hitching part and the connection part.

6. The camera module of claim 4, wherein the rear body includes a partition wall protrusively formed from the rear body to a front side, the packing member is so arranged as to wrap the partition wall in order to allow an inner surface to be contacted by the partition wall, and the partition wall includes a distancing part having a width corresponding to that of the connection part to accommodate the connection part.

7. The camera module of claim 6, wherein at least a part of the hitching part is so arranged as to contact the inner surface of the partition wall.

8. The camera module of claim 1, wherein the packing member is formed with a silicone or a rubber.

9. The camera module of claim 1, wherein the first lateral surface and the second lateral surface are so arranged as to be adjacently positioned.

10. The camera module of claim 1, wherein the first lateral surface and the second lateral surface are so arranged as to face each other.

11. The camera module claim 1, wherein the second lateral surface is positioned adjacent to the first lateral surface, the packing member includes a third lateral surface adjacent to the second lateral surface and a fourth lateral surface adjacent to the first lateral surface, and the support part further includes a third support part extended from the third lateral surface and a fourth support part extended from the fourth lateral surface.

12. The camera module of claim 11, wherein one of the first to fourth support parts has a shape different from that of the other three support parts.

13. The camera module of claim 1, wherein the lens part includes at least one lens, and a barrel configured to support the lens, and a sealing member is interposed between the barrel and the front body.

14. The camera module of claim 1, wherein the front body and the rear body are coupled by a screw.

15. The camera module of claim 14, wherein the packing member further includes an avoidance part so formed as to prevent interference with the screw.

16. A camera for a vehicle, comprising:
   a rear-opened front body;
   a rear body coupled to a rear side of the front body to form an inner space;
   a lens part coupled to the front body;
   an image sensor accommodated at the inner space to convert a light having passed the lens part to an electrical signal;
   a PCB (Printed Circuit Board) accommodated at the inner space and mounted with the image sensor; and
   a closed curve-shaped packing member interposed between the front body and the rear body,
   wherein the packing member includes a support part extensively formed from the packing member to an inner side, and the front body or the rear body includes a support part accommodation groove having a shape corresponding to that of the support part;

wherein the packing member includes a first lateral surface and a second lateral surface, and the support part includes a first support part extended from the first lateral surface and a second support part extended from the second lateral surface; and wherein the first support part has a different shape than the second support part.

17. A camera module, comprising:

a rear-opened front body;

a rear body coupled to a rear side of the front body to form an inner space:

a lens part coupled to the front body;

a PCB (Printed Circuit Board) accommodated at the inner space;

an image sensor disposed on the PCB;

a closed curve-shaped packing member interposed between the front body and the rear body;

a first support part extended from a first lateral surface of the packing member;

a second support part extended from a second lateral surface of the packing member;

a first support part accommodation groove recessed from a surface of the rear body and having a shape corresponding to that of the first support part to accommodate at least a portion of the first support part; and a second support part accommodation groove recessed from the surface of the rear body and having a shape corresponding to that of the second support part to accommodate at least a portion of the second support part, wherein the first support part has a different shape than the second support part.

* * * * *